J. J. DAIGNEAU.
STOVE OR FURNACE PIPE DAMPER.
APPLICATION FILED FEB. 8, 1916.
1,201,024.
Patented Oct. 10, 1916.
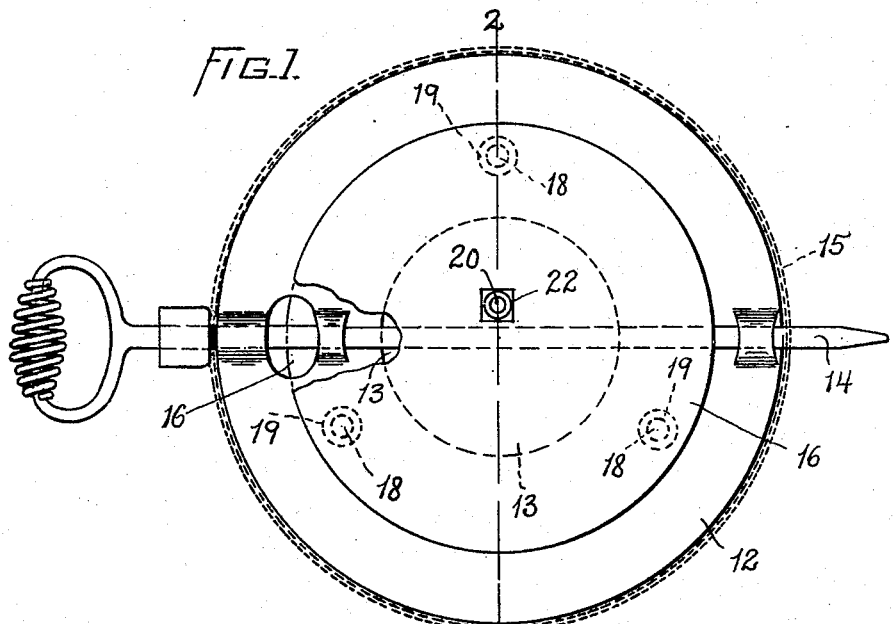
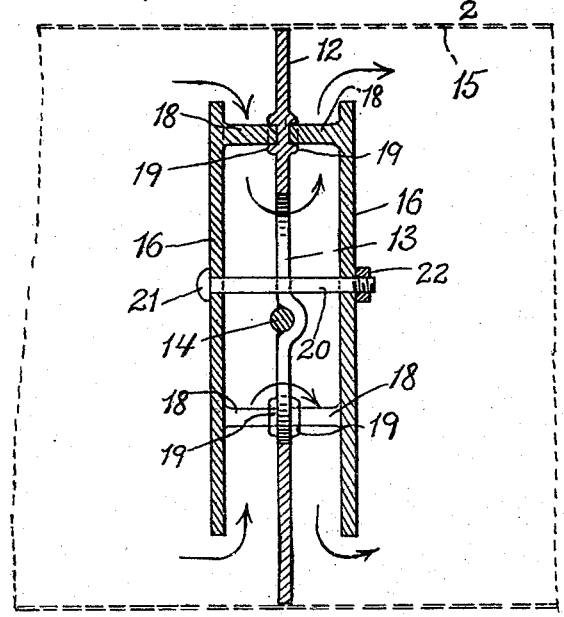
INVENTOR.
J. J. Daigneau
ATTYS.

UNITED STATES PATENT OFFICE.

JEREMIAH J. DAIGNEAU, OF NEWTON, MASSACHUSETTS, ASSIGNOR TO ARNOLD P. DAIGNEAU, OF SALEM, ALBERT J. DAIGNEAU, OF NEWTON, GUSTAVE DAIGNEAU, OF SALEM, FELIX DAIGNEAU, OF SPRINGFIELD, AND ROLAND DAIGNEAU, OF NEWTON, ALL OF MASSACHUSETTS.

STOVE OR FURNACE PIPE DAMPER.

1,201,024.      Specification of Letters Patent.      Patented Oct. 10, 1916.

Application filed February 8, 1916. Serial No. 76,950.

*To all whom it may concern:*

Be it known that I, JEREMIAH J. DAIGNEAU, a citizen of the United States, residing at Newton, in the county of Middlesex and State of Massachusetts, have invented new and useful Improvements in Stove or Furnace Pipe Dampers, of which the following is a specification.

The invention relates to a damper comprising a body adapted to turn as usual in a pipe, and provided with the usual central restricted draft opening, and baffle plates at opposite sides of the damper and spaced therefrom, the baffle plates being of smaller diameter than the damper and arranged to turn therewith in the pipe, the damper and baffle plates forming a sinuous draft-retarding passage in the pipe when the damper is closed, and standing edgewise so that they do not obstruct the draft when the damper is opened.

The invention has for its object to provide an improved construction permitting the connection of the baffle plates with the body by a single bolt, and preventing displacement of the plates and bolt in any direction.

The invention is embodied in the improvements which I will now proceed to describe and claim.

Of the accompanying drawings forming a part of this specification: Figure 1 represents a side view of a damper embodying my invention; Fig. 2 represents a section on line 2—2 of Fig. 1.

The same reference characters indicate the same or similar parts in all the views.

In the drawings: 12 represents a damper body having the usual restricted central draft opening 13, and provided with the usual or any suitable spindle 14 adapted to be journaled in holes in opposite sides of a stove or furnace draft pipe 15, the periphery of the damper body closely fitting the interior of the pipe when the damper is closed.

With the body 12 are rigidly connected two baffle plates 16, which are spaced from opposite sides of the body. Said plates are of smaller diameter than the body and their peripheries are concentric with the periphery thereof, the arrangement being such that when the damper is closed, as shown, the plates and body form a sinuous passage through which the heated products of combustion pass, as indicated by the arrows.

The baffle plates are secured to and spaced from the body by the conjoint action of a single bolt 20, a plurality of spacing legs 18, and means such as sockets 19 coöperating with said legs, as hereinafter described. As here shown, the spacing legs 18 are cast with the plates and project from their inner sides, the ends of said legs bearing on opposite sides of the body, which is provided with annular beads or ribs 19 forming sockets surrounding the ends of the legs and preventing the legs from slipping on the body. The bolt 20 has a head 21 and a nut 22, and passes through holes in the plates 16 and through the central opening 13 in the body and confines the plates with their legs against the body. The plates and body may be quickly assembled and permanently connected by inserting the bolt 20 and applying the nut 22 thereto. It will be seen that the single bolt 20, the legs 18, and the sockets 19, coöperate in securely connecting the baffle plates with the damper body, the bolt and legs preventing sidewise movement of the plates relatively to the body, while the sockets prevent edgewise movement of the legs and plates and sidewise movement of the bolt. The parts are therefore adapted to be quickly and securely assembled.

When the damper is closed heat accumulates between it and the burning fuel to a much greater extent than would be possible without the baffle plates 16. This accumulation of heat causes a more complete combustion of the fuel, increases the effectiveness of the stove or furnace, and results in a saving of fuel. At the same time there is always a sufficient outlet for the smoke and unconsumed gases.

Having described my invention, I claim:

1. A stove or furnace pipe damper comprising a damper body having a central restricted draft opening, baffle plates of smaller diameter than the body and located at opposite sides thereof, a bolt extending through said opening and engaged with said plates, legs holding the baffle plates spaced from the body, and means coöperating with said legs to prevent edgewise displacement of the baffle plates and sidewise displacement of the bolt.

2. A stove or furnace pipe damper comprising a damper body having a central restricted draft opening, baffle plates of smaller diameter than the body and located at opposite sides thereof, a bolt extending through said opening and engaged with said plates, legs formed on the baffle plates and bearing on opposite sides of the body, and sockets on said body engaging the inner ends of the legs to prevent edgewise displacement of the baffle plates and sidewise displacement of the bolt.

In testimony whereof I have affixed my signature.

JEREMIAH J. DAIGNEAU.

Copies of this patent may be obtained for five cents each, by addressing the "Commissioner of Patents, Washington, D. C."